Sept. 29, 1936.  H. CASLER  2,055,653
METHOD OF AND APPARATUS FOR TREATING PHOTOGRAPHIC PICTURES
Filed March 23, 1935  3 Sheets—Sheet 2
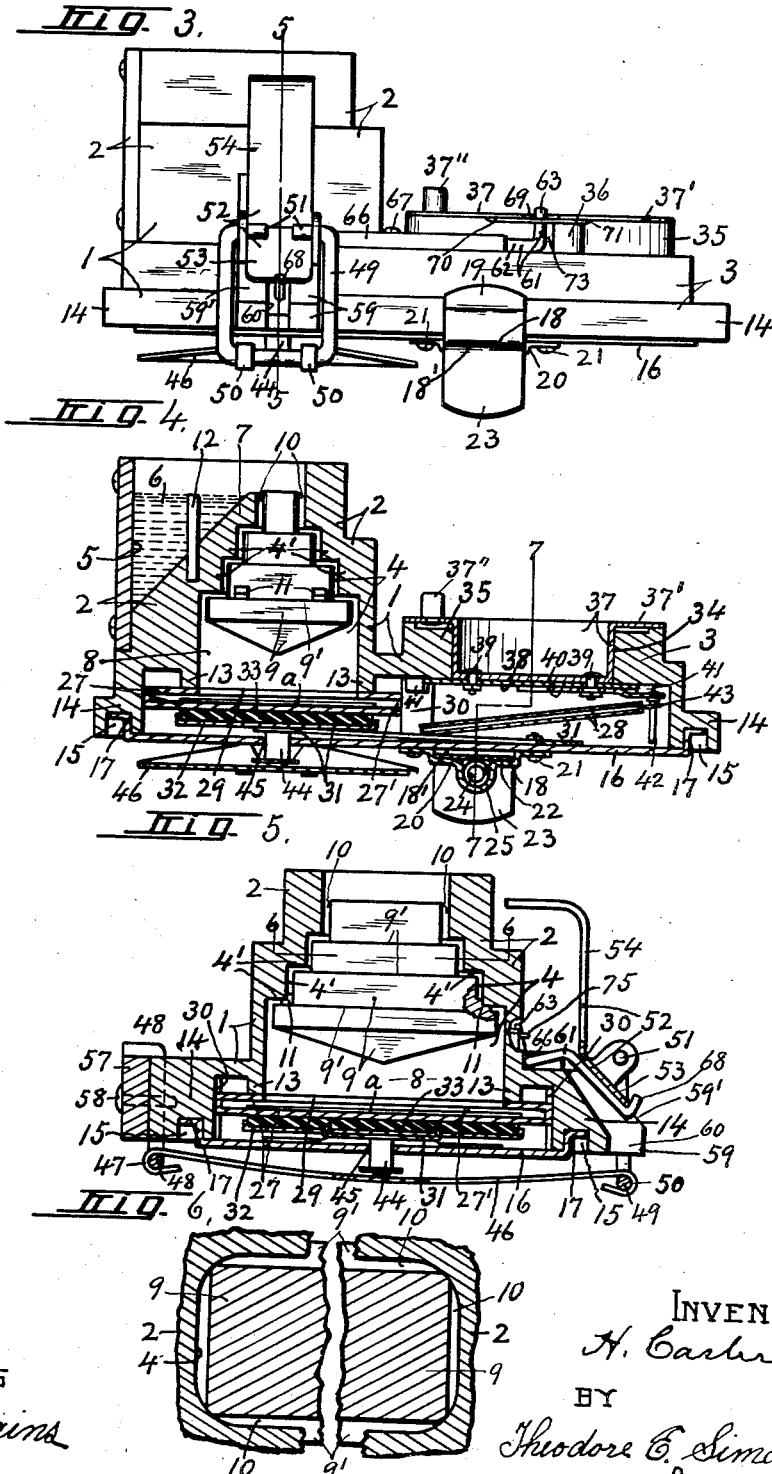
WITNESS
J. J. Mains
INVENTOR
H. Casler
BY
Theodore E. Simonton
ATTORNEY Sept. 29, 1936.  H. CASLER  2,055,653
METHOD OF AND APPARATUS FOR TREATING PHOTOGRAPHIC PICTURES
Filed March 23, 1935  3 Sheets-Sheet 3
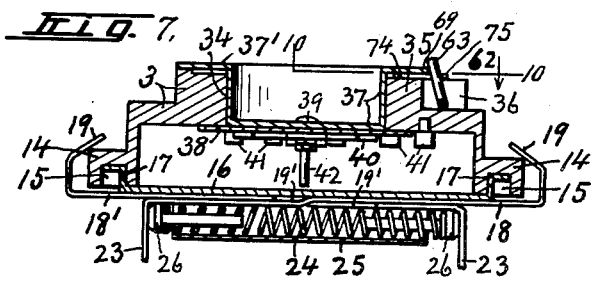
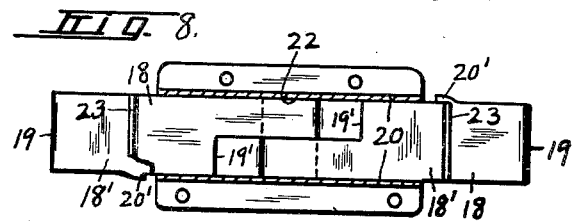
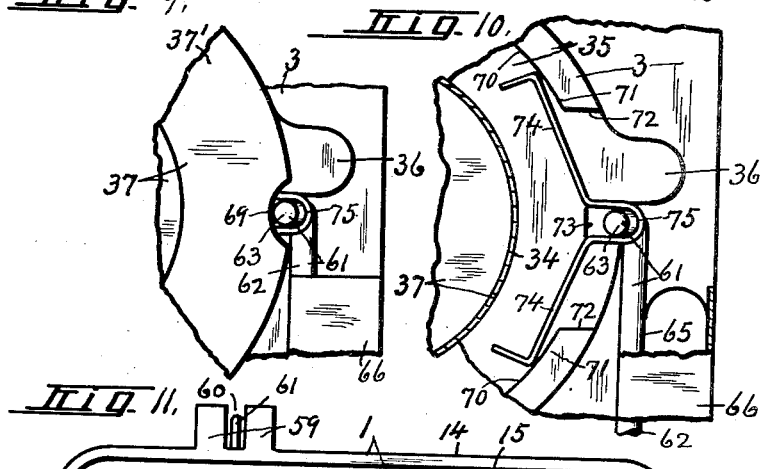
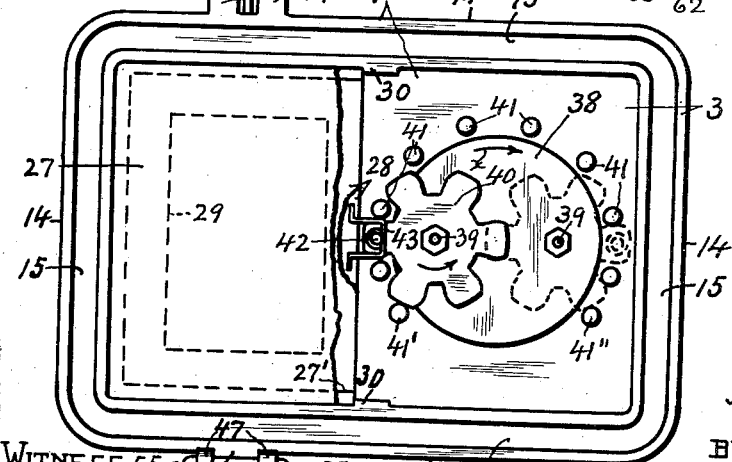
INVENTOR
H. Casler
BY
Theodore E. Simonton
ATTORNEY
WITNESS
J. T. Mains Patented Sept. 29, 1936

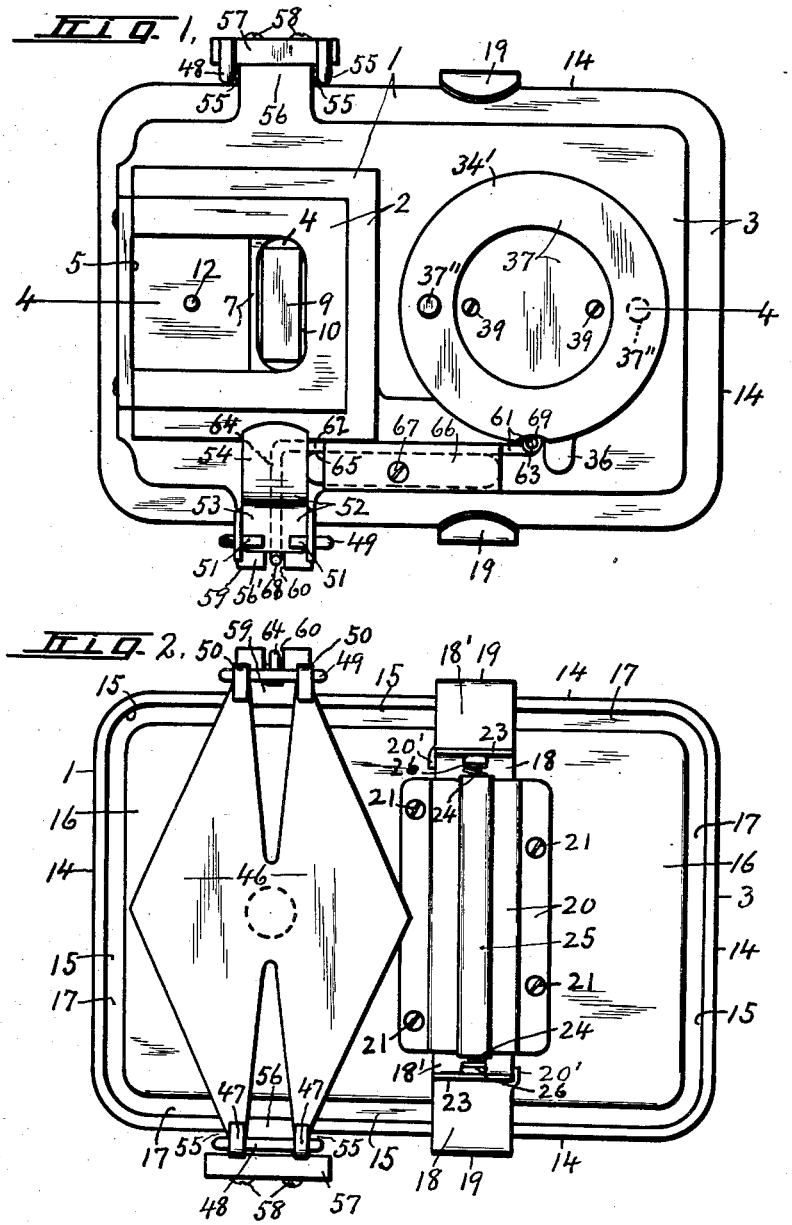

2,055,653

UNITED STATES PATENT OFFICE 2,055,653

METHOD OF AND APPARATUS FOR TREATING PHOTOGRAPHIC PICTURES

Herman Casler, Canastota, N. Y.

Application March 23, 1935, Serial No. 12,644

27 Claims. (Cl. 95—90)

This invention relates to a method of and apparatus for treating photographic pictures with developer and other liquids and involves the use of a portable frame or tray having a light-excluding opening therethrough for receiving the liquid and across which the picture is adapted to be supported in such manner as to allow the liquid to flow over and upon the face of the picture without exposing any part of the same to the light.

The main object is to enable a photographic picture, as it is produced by a camera, to be treated with one or more liquids in one and the same frame or tray without removal therefrom or exposure to light and also to avoid contact of the hands of the user with the liquid until the picture is properly developed and otherwise finished ready for display.

Another object is to provide the tray with a reservoir adapted to receive and retain a predetermined quantity of the liquid and arranged in such manner that the liquid may be discharged from the reservoir into said opening by simply tilting the tray in one direction.

A further object is to protect the picture from exposure to light or premature contact with the liquid by means of a shutter during and immediately following the transfer of the picture from the camera to the tray.

Other objects are:—To provide means operable at will for displacing the shutter from the picture without removing either of those elements from the tray; to provide releasable means for yieldingly holding both elements across the opening in the tray; and to prevent the operation of the holding means to its holding position until after the shutter has been displaced from the picture within the tray preparatory to the distribution of the liquid over the face of the picture.

Further objects and uses relating to the method and apparatus will be brought out in the following description.

In the drawings:—

Figures 1 and 2 are, respectively, a top plan and an inverted plan of a photo-picture developing and finishing apparatus embodying the various features of my invention, ready for use.

Figure 3 is a side elevation of the same apparatus.

Figure 4 is a longitudinal vertical sectional view taken on line 4—4 Figure 1, showing the shutter as withdrawn from the picture holder for permitting the application of the liquid to the picture.

Figure 5 is a transverse vertical view taken in the plane of line 5—5, Figure 3.

Figure 6 is an enlarged detail horizontal sectional view, partly broken away, taken in the plane of line 6—6, Figure 5.

Figure 7 is a detail vertical sectional view taken in the plane of line 7—7, Figure 4.

Figure 8 is a detail horizontal sectional view through the guide-plate for the clamping members by which the bottom plate of the tray is releasably held in place, the clamping members being shown in top plan.

Figure 9 is an enlarged top plan of a fragmentary portion of the tray showing parts of the shutter-operating means in the position indicated in Figures 1 to 5 inclusive.

Figure 10 is an enlarged detail horizontal sectional view, partly in top plan, taken in the plane of line 10—10, Figure 7 showing another part of the same shutter-operating means.

Figure 11 is an inverted plan of the tray with the bottom plate removed, showing the picture holder and shutter therein in operative position across the opening in the tray together with a portion of the shutter operating means in its initial position for holding the shutter in its closed position.

Tray

As illustrated, this apparatus comprises a substantially rectangular portable frame or tray 1 preferably of non-corrodible or acid-resisting material having an upright portion 2 near one end and a substantially horizontal portion 3 extending laterally from the upright portion 2 toward the opposite or front end, the upright portion 2 being provided with a vertical opening 4 therethrough from top to bottom adapted to receive one or more liquids commonly used in developing, washing, toning and otherwise finishing the picture ready for display.

The upright portion 2 is also provided with a reservoir 5 at the outer or rear end of the opening 4 for receiving and temporarily retaining a predetermined quantity of developer or other liquid 6 about sufficient for one treatment of the picture and is separated from said opening by an intervening wall or partition 7 common to both the reservoir 5 and the opening 4 and terminating at its upper end in a horizontal plane some distance below that of the top of the upright portion 2, to establish communication between the reservoir and opening and to allow the liquid to be transferred from said reservoir into the upper end of the opening by suitable forward tilting movement of the tray.

The opening 4 is substantially rectangular in top plan and preferably elongated transversely of the length of the tray and is open at the bottom to allow the liquid from the reservoir 5 to pass therethrough from top to bottom, the lower end of the opening being enlarged to form what may be termed a distributing chamber 8 having a horizontal area approximately equal to that of the picture which is supported across the lower end of the opening in a manner hereinafter described to permit the developer or other liquid entering said chamber to flow over the surface of the picture by proper manipulation of the tray.

As shown more clearly in Figures 4 and 5, a baffle plug or block 9 is operatively mounted in the upper portion of the opening 4 to extend downwardly from the plane of the upper end of the partition 7 into the upper portion of the chamber 8 in slightly spaced relation to the walls of said opening to restrict the passage of the liquid and thereby to cause a more even distribution thereof in transit from the reservoir 5 to the chamber 8.

The four walls of the opening 4 and adjacent sides of the block 9 are gradually stepped upwardly and inwardly at 4' and 9' respectively in complementary arrangement with their adjacent upright faces and also their corresponding horizontal faces in slightly spaced relation to form tortuous passages 10 for the liquid in transit from the reservoir 5 to the chamber 8 and also to prevent the passage of light through the opening to the picture during the operations of developing and otherwise finishing the picture within the tray. (See Figures 4 and 5).

For convenience of manufacture, the plug 9 is made separately from the main body of the tray 1 and is inserted from the bottom upwardly into the opening 4 in such manner that the four corners of portions thereof may frictionally engage the corresponding corner walls of the opening to hold it in operative position without interrupting the passage of the liquid as shown in Figure 6.

It will be noted upon reference to Figures 4 and 5 that the horizontal faces of the steps 4' are arranged in overlying or overlapping relation to the horizontal faces of the corresponding steps 9' to further reduce the liability of the passage of light through the opening 4 to the picture and that the contiguous portions of the steps 4' and 9' may be held in spaced relation by one or more angular stops or seats 11 which are preferably formed upon the lower step or flange 9' of the block 9 to engage the lower inner corner of the adjacent step 4' as shown.

It is evident, however, that any other suitable means may be employed for holding the block 9 in operative position.

The reservoir 5 is adapted to receive and to temporarily retain a single charge of developer or other liquid sufficient for one treatment of a single picture in the tray and for this purpose, is provided with a gauge 12 projecting upwardly from the bottom thereof to a level slightly below that of the upper end of the partition 7 and representing the maximum level of the liquid in use to avoid premature discharge of the liquid from the reservoir into the opening 4, the bottom of the reservoir being preferably inclined upwardly and inwardly to facilitate such discharge when the tray is slightly tilted endwise forwardly from its normal horizontal position.

Surrounding the lower end of the opening 4 is a pendant flange 13 forming a part of the tray 1 and having its lower end face disposed in a horizontal plane at right angles to the axis of said opening to form a seat against which the pack containing the picture and shutter is adapted to be held across the lower end of said opening during the developing and other picture-finishing operations. (See Figures 4, 5, and 11.)

The bottom of the tray 1 is also provided with a marginal flange 14 projecting downwardly therefrom around and in spaced relation to the flange 13 and having its lower edge disposed in a plane below and parallel with that of the flange 13 to rest upon a substantially horizontal supporting surface while the reservoir 5 is being filled and also to form a space for receiving the pack and other parts of the device hereinafter described, said flange 14 being provided in its underside with a groove 15 extending continuously along the four sides thereof.

A bottom plate 16, preferably of sheet metal, is removably secured to the lower edge of the marginal flange 14 to extend across the intervening space in spaced relation to and parallel with the lower edge of the flange 13 and is provided with an upturned marginal flange 17 seated in the groove 15 to assist in holding it against accidental lateral displacement.

*Bottom plate clamp*

The plate 16 also extends across the bottom of the horizontal extension 3 of the tray 1 in spaced relation to the top wall thereof and is releasably held in its closed position by a pair of sheet metal clamping bars 18 and 18' which are slidable one upon the other across the underside of said plate and have their outer ends provided with upwardly and inwardly projecting jaws 19 movable therewith into and out of engagement with the outer upper corners of the opposite lengthwise portions of the marginal flange 14 as shown more clearly in Figures 1, 2, 3, 7, and 8.

The clamping bars are held in operative position by means of a sheet-metal guide-plate 20 which is secured to the underside of the bottom plate 16 at opposite sides of said bars by means of screws 21 and is formed with a groove 22 for receiving said bars and guiding the same in their transverse movement.

The other ends of the clamping bars 18 and 18' are provided respectively with downwardly or outwardly projecting finger-engaging members 23 whereby said bars may be moved endwise by hand against the action of a coil spring 24 which is partially enclosed in a looped portion or barrel 25 of the guide-plate 20 as shown more clearly in Figures 2, 4, and 7, and is tensioned to move both bars endwise in opposite directions for automatically closing the jaws 19 upon the adjacent sides of the marginal flange 14 of the tray 1, it being understood that the movement of the finger pieces 23 toward each other by hand against the action of the spring will open the jaws and thereby allow the bottom plate 16 to be removed from the tray.

The intermediate portions of opposite edges of the slide bars 18 and 18' are cut away at 19' approximately one-half their widths to allow the finger-piece end of each bar to underlap upon the jaw-end of the other bar, the length of the cut-outs 19' being sufficient to permit complete closing movement of the jaws against the adjacent sides of the flange 14 under the action of the spring 24 and also to permit the jaws to be opened against the action of said spring to release the bottom plate 16.

The outer lengthwise edges of the slide-bars 18 and 18' are provided with stop shoulders 20' adapted to engage opposite ends of the guide-plate 20 for limiting the closing movement of the jaws 19 by the spring 24 particularly when the bottom plate 16 is removed from the tray and also to assist in equalizing the opening movement of said jaws when removing or replacing the bottom plate.

The opposite ends of the spring 24 are provided with co-axial bearing pins 26 inserted therein to bear against the corresponding finger pieces 23 and thereby to facilitate the operation of the clamping bars 18 and 18' without excessive friction or wear.

Picture pack

The pack, as it is taken from the camera with the photographic picture and protective shutter therein, preferably includes a relatively shallow rectangular sheath or envelope 27 mainly of acid-resisting paper or equivalent comparatively inexpensive material and having three of its sides and bottom portion closed and its remaining front side open at 27' for receiving a slide-shutter 28, the upper side of said sheath being formed with a rectangular opening 29 of about the same area as that of the lower end of the opening 4 or chamber 8 with which it is adapted to register when the pack is placed in proper position within the tray for developing the picture as a Figures 4 and 5.

This picture may be a photographic film, card or plate and is preferably secured by adhesive or otherwise to the upper face of the bottom of the sheath 27 in vertical alignment with the opening 29 so that when the pack with the picture therein is placed in operative position within the tray and against the underside of the flange 13, the picture a and superposed shutter 28 will underlie or extend across the lower end of the opening 8 to permit the liquid in said opening to flow over and upon the face of the picture when the shutter 28 is opened in a manner hereinafter described.

The pack, including the sheath 27 with the picture a and shutter 28 therein, is of somewhat greater area than the lower end of the chamber 8 and, when the bottom plate 16 is removed, is placed against the lower edge of the flange 13 to project approximately equal distances beyond the ends and sides thereof with the picture a in vertical alignment with said chamber and facing upwardly and the shutter in its closed position across the face of the picture for protecting the latter against exposure. (See Figure 11.)

The portions of the flange 14 at opposite sides of the chamber 8 are spaced to conform approximately to the transverse width of the sheath 27 and are provided with inwardly projecting stop shoulders 30 which are spaced from the rear end portion of the same flange 14 a distance approximately equal to the length of the sheath for engaging the opposite ends of the front edge of said sheath to hold the latter against forward movement when the shutter is withdrawn or opened from its closed position in a manner hereinafter described, it being understood that the transverse width of the shutter is somewhat less than that of the sheath and also less than the distance between the opposite shoulders 30 to allow movement of the shutter between the shoulders. (See Figures 4, 5, and 11.)

When the pack is placed in operative position in the tray, the bottom plate 16 is restored to its closed position and clamped in place by the sliding jaws 19 through the action of the spring 24 as shown in Figure 7.

A relatively thin spring plate 31 is secured near one end by two of the bolts 21 to the upper or inner face of the bottom plate 16 to extend rearwardly below the bottom of the sheath 27 and has its rear end free to move vertically against its own tension and to this free end of the spring is secured a pad-holder 32 carrying a soft rubber or equivalent resilient pad 33 for engaging and temporarily supporting the sheath with the picture a and shutter 28 therein lightly against the lower edge of the marginal flange 13 and across the lower end of the chamber 8 preparatory to withdrawing the shutter in a manner presently described. (See Figures 4 and 5.)

Shutter operation

Suitable means is provided for withdrawing the shutter 28 from the sheath 27 following the closing and clamping of the bottom plate 16 to and across the bottom of the tray 1 and for this purpose, the top wall of the front horizontal extension 3 is provided with a cylindrical bore or opening 34 surrounded by a raised annulus 35 having a lateral stop shoulder 36 projecting outwardly from one side thereof as shown in Figures 1, 4, 9, and 10.

A rotary cup-shaped disc 37 is journaled in the opening 34 to extend therethrough from top to bottom and has its upper end provided with an outturned annular flange 37' resting upon the upper face of the annulus 35 to hold it against relative downward displacement, said flange 37' being provided with a handle 37'' by which the disc 37 may be turned about its axis, the bottom of the disc 37 being substantially flush with the underside of the top wall of said extension 3 as shown in Figures 4 and 7.

A flat circular disc 38 of greater diameter than the opening 34 is secured by bolts 39 to the bottom of the cup-shaped disc 37 co-axial therewith to extend radially beyond said opening for engaging the underside of the top of said extension and preventing accidental upward displacement of the disc 34 without in any way interfering with the free rotation of both discs by hand when desired.—(See Figures 4 and 11.)

A sheet metal planetary gear wheel 40 is centrally journaled upon or pivoted to the lower disc 38 some distance to one side of the axis of the discs 37 and 38 through the medium of one of the bolts 39 to mesh with a series of relatively fixed gear studs 41 which are arranged in circumferentially spaced relation about said axis, one of the teeth of the wheel 40 being provided with a pendant pin 42 adapted to engage in a staple 43 on the front edge of the shutter 28 as shown in Figures 4, 7, and 11.

The teeth of the gear wheel 40 and the fixed gear studs 41 are arranged in such relation that when the discs 37 and 38 are rotated one-half revolution, the pin 42 on the gear wheel 40 will be moved rectilinearly and diametrically across the disc 38 thus constituting one means for converting the rotary motion of the discs 37 and 38 into a rectilinear motion of the pin 42 and shutter 28 connected thereto.

Before the sheath containing the picture a and shutter 28 are placed in operative position across the lower end of the chamber 8 and also before the bottom plate 16 is closed, the discs 37 and 38 will have been turned to bring the wheel 40 and its pin 42 to their extreme rear positions as shown in Figure 11 so that when the sheath 28 with the shutter therein are placed in operative position across the lower end of the opening 8, the staple 43 will automatically interlock with the pin, after which the bottom plate 16 may be placed in its closed position and clamped to the tray by means of the clamping jaws 19.

When the bottom plate 16 with the pad 33 thereon is restored to its closed position, the discs 37 and 38 will be rotated one-half revolution in the direction indicated by arrow X, Figure 11, thus causing a planetary movement of the gear 40 through a corresponding arc and incidentally rotating said gear one complete revolution from the position shown by full lines to that shown by dotted lines in Figure 11 and also by full lines in Figure 4 for withdrawing the shutter 28 from the sheath 27 and thereby exposing the picture a to the interior of the liquid receiving chamber 8 after which the pad-holder 27 will be operated against the action of its supporting spring 31 to yieldingly press the picture containing sheath against the underside of the flange 13 in a manner hereinafter described preparatory to the introduction of the liquid into said chamber for treating the picture.

The gear-studs 41 are arranged in an arc slightly greater than a half circle and, at each end of this arc are additional fixed studs 41' and 41'' which are spaced from adjacent gear studs 41 a distance less than the diametrical pitch of the teeth of the gear 40 to form stops adapted to be engaged respectively by the points of the gear teeth at opposite sides of the one carrying the pin 42 as the disk 37 carrying the disk 38 is rotated in reverse directions, and thereby limiting the rotary movements of both the operating disk 37 and gear 40 in either direction. (Figure 11.)

Pad-operating means

Suitable means is provided for effecting a final yielding pressure of the picture-containing sheath 27 against the underside of the flange 13 preparatory to the application of the liquid to said picture, and also for preventing the operation of the final pressure means until the shutter 28 is entirely withdrawn from the sheath, and for these purposes a plunger pin 44 is passed loosely from the underside upwardly through an opening 45 in the bottom plate 16 directly under the center of the pad-holder 32 to engage the lower face of the adjacent portion of the spring 31 and has its lower end adapted to engage the intermediate portion of a resilient sheet metal cross-plate or bar 46 as shown more clearly in Figures 2, 3, 4, and 5 so that the plunger is normally held by and between the cross-plate 46 and free end of the spring 31, see Figures 4 and 5.

The cross plate 46 is hinged at one end at 47 to the intermediate portion of a U-shaped anchor-rod 48 on one side of the marginal flange 14 of the tray 1 to swing to and from a position across the underside of the bottom plate 16 in the vertical plane of the opening 10 when said bottom plate is closed and has its other end provided with a U-shaped link 49 having its intermediate portion hinged thereto at 50 to swing lengthwise thereof, the opposite ends of said link being offset toward each other to form pintles 51 upon which is pivoted a bell-crank locking-lever 52 having a relatively short latch-engaging arm 53 and a longer hook-shaped handle-arm 54 as shown in Figures 1, 3, and 5.

The opposite arms of the U-shaped anchor rod 48 are seated in vertical grooves 55 in opposite sides of a lug 56 on the corresponding side of the tray 1, the upper ends of said rod being offset outwardly to engage the underside of a retaining cap 57 which is secured to the outer face of the lug 56 by screws 58 as shown in Figures 1, 2, 5, and 11 to permit the removal and replacement of the plate 46 if necesary or desirable.

The side of the tray 1 opposite the lug 56 is provided with a lug 59 adapted to project outwardly between and beyond the opposite arms of the link 49 when the pressure plate 46 is swung to its clamping position and is provided with a vertical slot 60 open at its outer face for receiving one end of a latch lever 61 which is adapted to be operated and controlled by the shutter operating means in a manner presently described, the upper face of the lug 59 being inclined upwardly and inwardly at 59' to form a seat or bearing surface for the shorter arm 53 of the locking lever 52 when the latter is in its locking position as shown more clearly in Figures 3 and 5.

Latch-lock and release

The latch-lever 61 is preferably made in the form of a crank-shaft having a straight intermediate portion 62 and opposite end crank-arms 63 and 64, the straight portion 62 being journaled in a lengthwise groove 65 in the upper face of the tray 1 at the outer side of the annulus 35 and upright portion 2 and is held against upward displacement by a removable cap-plate 66 which is secured to the outer wall of the groove by a bolt 67 as shown in Figure 1, without in any way interfering with the free turning movement of the crank-shaft about its axis.

The front crank-arm 63 is offset upwardly at substantially right angles to the straight portion 62 and across the periphery of the top flange 37' of the rotary disc 37 and closely adjacent the rear face of the lug 36 on the annulus 35 to rock laterally in a plane at right angles to the longitudinal center of the tray passing through the axis of said disc, the lug 36 serving as a stop to prevent undue axial movement of said crank-shaft.

The rear crank-arm 64 is offset outwardly and downwardly into the slot 60 of the lug 59 to rock in the vertical plane thereof closely adjacent the rear wall of the slot to prevent undue rearward axial displacement of the crank shaft and has its lower end terminating in an upturned hook 68 which is movable therewith within and beyond the plane of the inclined face 56' of the lug 56 as controlled by the position of the shutter operating disc 37 and shutter 28.

For this latter purpose, the flange 37' of the disc 37 is provided in one side with a peripheral notch or recess 69 for receiving the upper end of the front crank-arm 63 only when the disc 37 is adjusted rotarily to withdraw the shutter from its closed position shown in Figure 11 to its fully open position shown in Figure 4.

As shown more clearly in Figures 3, 9, and 10, the upper surface of the annulus 35 is provided with a relatively shallow recess 70 forming correspondingly shallow segmental ribs 71 which are spaced apart circumferentially to form a substantially radial opening 72 between them registering with front crank-arm 63, the adjacent side of the annulus 35 being recessed at 73 to permit the crank-arm to enter the notch 69 when the latter is registered therewith. (See Figure 10.)

A relatively light wire spring 74 is seated in the recess 70 just beneath the adjacent portion of the flange 37' of the shutter-operating disc 37 to extend across the opening 72 and has its opposite ends slidably engaged with the inner faces of the ribs 71 and its intermediate portion formed with an outturned loop 75 which engages the upper portion of the front crank-arm 63 and serves to urge said arm inwardly against the periphery of said flange 37 so that when the peripheral notch 69 is registered with its crank-arm 63, it will allow the latter to be rocked inwardly into said notch by the spring 74 and thereby to rock the rear crank-arm 64 outwardly into position to be engaged by the shorter arm of the lever 52 as the latter is moved to its locking position. (See Figures 9 and 10.)

It will be noted, however, that if the disc 37 remains in the position shown in Figure 11 for closing the shutter 28, the notch or recess 69 in the periphery of the disc-flange 37' will be at the diametrically opposite side of the axis of the disc 37 from the front crank-arm 63 and that said crank-arm will then be forced outwardly by the adjacent portion of said periphery thus causing the rear crank-arm 64 and its terminal hook 68 to be rocked inwardly beyond the plane of the inclined outer face of the lug 59 under which conditions any attempt to rock the lever 52 to its locking position will cause the free edge of its shorter arm to ride along and upon said inclined face without engaging the terminal hook 68 and thereby prevent the further operation of the pad 33 and resultant compression of the pack against the underside of the flange 13.

On the other hand, when the disc 37 is turned to register its notch 69 with the front crank-arm 63, the spring 74 will automatically force said crank-arm into the notch 69 and at the same time force the rear crank-arm 64 and its terminal hook 68 outwardly into position to be engaged by the shorter arm of the lever 52 when the latter is moved to its locking position for pressing the picture-containing sheath 27 against the underside of the flange 13.

It is now clear that when the pack with the shutter 28 therein has been placed in the tray across the lower end of the chamber 8 in the manner previously described, the pressure plate 46 cannot be closed and locked in its closed position by the operation of the lever 52 until after the disc 37 has been operated to withdraw the shutter from the pack at which time the notch or recess 69 will have been registered with the front crank-arm 63 to allow the spring 74 to rock the crank-shaft and thereby to move the rear crank-arm into position to be engaged by the locking lever 52 for locking the pressure-plate in position to press the picture-containing sheath against the underside of the flange 13 with its open upper side facing the chamber 8 ready to receive the liquid which may be introduced from the top into said chamber.

The picture or image $a$, either negative or positive, may be impressed by any well-known photographic or printing process upon the sensitized surface of a suitable carrier such as a film, a card or plate, any one of which is adapted to be secured within the pack and protected from exposure by means of a shutter as 28 during the transfer of the pack from a camera or other printing device to the developing apparatus forming the subject-matter of this application.

*Operation*

When it is desired to develop the photographic image, the lever 52 will be operated to release the pressure plate 46 from its locked position to enable the same together with the locking lever 52 to be rocked laterally to one side of the tray 75 after which the clamping jaws 18 and 18' may be released from engagement with said tray to enable the bottom plate 16 to be removed.

The shutter-controlling disc 37 may be then turned to bring the gear wheel 40 and its pin 42 to the position shown in Figure 11.

The pack, as it comes from the camera containing the sheath 27, image $a$ and shutter 28, is then placed in operative position within the compartment in the bottom of the tray across the lower end of the chamber in the manner shown in Figure 11 to interlock the staple 43 with the pin 42 after which the bottom plate 16 is restored to its closed position and temporarily held in place by the jaws 18 and 18', it being understood that during this latter operation, the pad 33 will be brought into engagement with the under side of the sheath 27 as shown more clearly in Figures 4 and 5.

The disc 37 is then rotated by means of its handle 37'' to move the gear wheel 40 from the position shown by full lines to the position shown by dotted lines in Figure 11 and thus, withdrawing the shutter 28 from the sheath 27 from its closed position to its open position as shown more clearly in Figure 4.

This turning movement of the disc 37 brings the peripheral notch or recess 69 into registration with the upturned crank-arm 63 of the crankshaft 61 thus, allowing the spring 74 to rock said crank-arm inwardly a limited distance and incidentally, rocking the rear crank-arm 64 outwardly to bring the latch 68 beyond the inclined face 59' of the lug 59 as shown in Figure 5.

The clamping plate 46 is then closed across the underside of the locking plate 16 caused by the inward rocking movement of the upper end of the lever 52 which causes the lower end of said lever to engage the latch member 68 thereby placing the intermediate portion of the pressure plate 46 under tension against the lower end of the plunger 44, thereby compressing the sheath 27 with the image therein against the under side of the flange 13 and across the lower end of the chamber 8, it being understood that when the lever 52 is moved inwardly to the position shown in Figure 5, its upper end will be moved beyond a direct line between the latch 68 and pintles 51 for locking the lever in its closed position.

It is, of course, understood that during this operation, the picture or image $a$ will be exposed to the chamber 8 through the opening 29 in the upper side of the sheath 27.

The developer or other liquid is then introduced in any suitable manner into the reservoir 5 to the level of the top of the gage pin 12 after which the tray may be tilted forwardly and downwardly to allow the liquid to flow upon the reservoir 5 into the upper end of the restricted passage 10, said liquid being then free to flow downwardly through said passage and into the chamber 8 and thence through opening 29 on to the surface of the image $a$ and by suitably tilting the tray forwardly and rearwardly and also laterally, this liquid is caused to flow evenly over and upon the surface of the image until the latter is fully developed, it being understood that one charge of the liquid in the reservoir 5 is sufficient for this purpose.

After the liquid has been allowed to flow back and forth across and upon the surface of the image until the latter is fully developed, the entire apparatus is then inverted to such position as to allow the liquid to escape from the chamber 8 through the passage 10 and into an underlying waste receptacle (not shown).

The tray may then be placed in an upright position and the reservoir 5 refilled with a washing fluid whereupon the operation of flowing the fluid over and upon the surface of the image will be repeated caused by the re-inversion of the apparatus to discharge the washing fluid from said chamber. In like manner, other liquids as used in toning or otherwise finishing the picture, may be used in the reservoir and subjected to the same manipulation of the tray for further treatment of the image, it being understood that after each application of liquid to the image, the tray will be inverted to discharge the liquid therefrom.

When the picture or image is completed, ready for display, the pressure plate 46 will be released from its closed position by proper operation of the lever 52 followed by the release and withdrawal of the bottom plate 16 to enable the sheath 27 with the picture thereon and also the shutter 28 to be removed from the apparatus. When the sheath 27 with the picture thereon is removed, it may be used for display of the picture or the latter may be removed for display by itself or mounted on another support.

As soon as the sheath 27 with the finished image therein and shutter 28 have been removed, the apparatus is ready to receive another pack from the camera under which conditions the disc 37 with the gear wheel 40 thereon will be returned from the position shown by dotted lines to the position shown by full lines in Figure 11 so that the pack containing a new image may be placed in operative position in the manner described to interlock its staple 43 with the pin 44 ready for a repetition of the operation previously described.

Although I have shown and described a particularly simple, practical and efficient means for developing photographic images as they are produced by a camera or other printing machine, it is evident that various changes may be made in the detailed construction of the apparatus without departing from the spirit of the invention.

I claim:

1. A photo-picture developing frame adapted to receive a liquid and of which the picture forms a portion of one side, a shutter movable to and from a position across the surface of the picture, and means mounted on the frame for operating the shutter.

2. An apparatus for developing photographic pictures comprising a frame adapted to receive a liquid and having an opening in one side, means for supporting the picture across said opening, a shutter movable to and from a position across the picture, and means operatively mounted on the frame for operating the shutter.

3. In an apparatus for developing photographic pictures, a tray for receiving a developer liquid, means for supporting the picture in a definite position on the tray to contact with the liquid, a shutter movable to and from a position across the picture, and means mounted on the frame for operating the shutter.

4. A portable photo-picture developing tray adapted to receive a developer liquid and having an opening in its lower side, means for supporting the picture across said opening to face upwardly, and a shutter movable to and from a position across the face of the picture.

5. A photo-picture developing tray having a baffle therein defining a chamber at one side thereof which is adapted to receive a liquid, and forming a picture-developing chamber at the other side of said baffle, said baffle normally preventing passage of the liquid to the developing chamber, but permitting the liquid to flow over the baffle into the developing chamber when the tray is tilted.

6. A photo-picture developing tray having a liquid inlet in one side and an opening in its opposite side, and a pack across said opening including the picture and a shutter normally across the face of the picture, in combination with means for displacing the shutter from the picture to allow the liquid to flow over said picture.

7. A device for developing photographic pictures comprising a frame having a downwardly extending light-excluding passage for receiving a liquid, said passage including laterally stepped walls and having a correspondingly stepped baffle plug mounted therein in spaced relation to the walls of the passage, and means for supporting the picture across said passage to receive the liquid on the face thereof.

8. A device for developing photographic pictures comprising a frame having a chamber open at the bottom and an inlet open at the top, said frame having a reservoir at one side of the inlet for receiving a developer liquid, the frame being tiltable to discharge the liquid from the reservoir into the inlet, and means for supporting the picture across the lower end of the chamber.

9. An apparatus for developing photographic pictures comprising a frame having a light excluding opening adapted to receive a liquid, releasable means for supporting the picture across the lower end of the opening, said releasable means including a pressure plate adapted to engage the rear face of the picture, and means for exerting a yielding pressure on the bottom of the pressure plate.

10. An apparatus for developing photographic pictures comprising a frame having a tortuous passage therethrough from top to bottom for receiving a developer liquid or the like, the lower end of said passage terminating in an enlarged chamber, the horizontal cross-sectional dimensions of which conform approximately to the dimensions of an image carrier of predetermined size, and means for supporting the image carrier from the frame and across the lower end of said chamber, said image carrier constituting a bottom for said chamber and frame and adapted to receive the liquid on the upper surface of the same.

11. An apparatus for developing photographic pictures comprising a frame having an opening therethrough for receiving a developer liquid, a shutter movable to and from a position across the opening, releasable means for holding the picture across the underside of the frame opening, and means for operating the shutter.

12. An apparatus as in claim 11 in which means is provided for preventing the operation of the first means to its holding position while the shutter is in its closed position.

13. A device for developing photographic images comprising a frame provided with an opening, pliable means beneath the image carrier for holding the image carrier across said opening and against said frame to form a liquid-tight joint between said frame and said image carrier.

14. A device for developing photographic images comprising a frame provided with a developing compartment adapted to receive a liquid, a compartment adapted to receive an image carrier, said image carrier being protected from light by a suitable covering, separate means for excluding light from said compartment, means for uncovering said image carrier after being placed within its compartment, means for holding said image carrier across said developing compartment and against said frame to allow the liquid to flow over the surface of the image carrier.

15. A device for developing photographic images comprising lateral retaining walls adapted to confine a liquid in contact with an image carrier, clamping means beneath the image carrier adapted to hold the surface of said image carrier in contact with said lateral retaining walls, to permit the liquid to come in contact with said image carrier.

16. A device of the class described, comprising a frame having a restricted passage therethrough from top to bottom, the walls of said passage being stepped laterally and terminating in an enlarged chamber open at the bottom, said latter opening at the bottom of the chamber conforming approximately to the size of an image carrier of predetermined size, and means for supporting the image carrier across the lower end of the chamber whereby the image carrier constitutes a bottom for the chamber.

17. A device of the class described, comprising a frame having a restricted passage therethrough from top to bottom for receiving a liquid, the walls of said passage being stepped laterally, and means for supporting an image carrier across the lower end of said passage, portions of the opposite walls of said passage being arranged in overlapping spaced relation to exclude light from the image carrier.

18. An apparatus for developing photographic packs embodying an image carrier and shutter means for excluding light from the pack, a tray having an opening extending from top to bottom therethrough, means associated with the tray for supporting the pack with the image carrier forming a bottom closure for the opening through the tray, and means mounted on the tray and operatively connected to the shutter for operating the same to expose the image carrier to a developer liquid adapted to be introduced into the tray through the opening aforesaid.

19. A portable photo-picture developing tray adapted to receive a developer liquid and having an opening in its lower side, means for supporting the picture across said opening to face upwardly, a shutter movable across the face of said picture, and means mounted on the tray for moving said shutter.

20. The method of developing photographic images, which comprises introducing the image carrier with the image masked to exclude light therefrom into a tray having a light-excluding developing compartment, withdrawing the mask while in the developing compartment and under light-excluding conditions afforded by said compartment, introducing a developing liquid into the developing compartment, and directing the developing liquid over the image carrying surface of the carrier.

21. The method of photographic recording, which comprises exposing a photo-sensitive image carrier to the subject, masking the image carrier subsequent to said exposure, transferring the image carrier while in masked condition to a developer tray having a light-excluding developing compartment therein, withdrawing the image carrier mask while under light-excluding conditions afforded by the developing compartment of the tray, introducing a developing liquid into the developing compartment of the tray, and directing the developing liquid over the image carrying surface of the image carrier.

22. A photo-picture developing tray, comprising a frame having an opening therethrough from top to bottom, a partition extending across said opening so as to provide at one side thereof an upwardly open fluid measuring chamber adapted to receive a predetermined quantity of fluid, and at the other side, a developing chamber into which the fluid may be received from the measuring chamber aforesaid, and means for supporting a picture across the lower end of the opening through the frame to form one side of the developing chamber and confine the fluid in the latter chamber for action upon the picture.

23. In a photographic apparatus, a frame having an opening in one side, means for supporting a photosensitive element and an associated movable masking shutter across said opening, and means mounted on said frame for moving said shutter while the photosensitive element is so supported.

24. A photographic apparatus comprising a frame, means for supporting a photosensitive element on said frame, a shutter normally covering said photosensitive element and movable to uncover the same, means for maintaining said photosensitive element in a definite position during movement of said shutter, and means carried by said frame and engageable with said shutter to move the latter from its normal position to uncover the photosensitive element for action on the latter while in such definite position.

25. A photographic apparatus comprising a frame, means for supporting in one part of said frame a photographic emulsion carrier having a shutter covering the emulsion on said carrier, means mounted on said frame for moving the shutter into another part of the frame to uncover the emulsion, and means carried by said frame for admitting into the first-mentioned part of the frame an emulsion-affecting medium adapted to act upon the emulsion while the emulsion carrier is supported in that part of the frame.

26. A photo-picture developing apparatus, comprising a fluid receiving frame provided with an opening in one side thereof adapted to be closed by an element having a photo-sensitive surface normally masked by a shutter, means for effecting relative movement between the shutter and the photo-sensitive element to unmask or expose the latter, and means for supporting the unmasked element across said opening to confine the fluid within the frame for action upon the photo-sensitive surface of the element.

27. An apparatus for developing photographic pictures, comprising a frame having an opening for receiving a picture-treating fluid and across the bottom of which is adapted to be arranged an image carrier normally covered by a shutter, means for clamping said image carrier against the bottom of said frame across said opening, and means for preventing operation of said clamping means while the shutter covers said image carrier.

HERMAN CASLER.